(12) United States Patent
Takeda (10) Patent No.: US 7,651,629 B2
(45) Date of Patent: Jan. 26, 2010

(54) LIQUID CRYSTAL DISPLAY DEVICE

(75) Inventor: Shintaro Takeda, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 150 days.

(21) Appl. No.: 11/774,190

(22) Filed: Jul. 6, 2007

(65) Prior Publication Data

US 2008/0017830 A1  Jan. 24, 2008

(30) Foreign Application Priority Data

Jul. 7, 2006   (JP) .............................. 2006-187348

(51) Int. Cl.
*C09K 19/00* (2006.01)
*C09K 19/06* (2006.01)
*C09K 19/52* (2006.01)

(52) U.S. Cl. .............................. 252/299.6; 252/299.01; 252/299.63; 252/299.64; 430/20; 349/1; 349/106; 349/113; 349/182

(58) Field of Classification Search ............ 252/299.01, 252/299.6, 299.62–299.64, 299.66; 430/20; 349/1, 106, 113, 182
See application file for complete search history.

(56) References Cited

U.S. PATENT DOCUMENTS

| | | | |
|---|---|---|---|
| 5,961,881 A | 10/1999 | Andou et al. | |
| 6,007,740 A | 12/1999 | Andou et al. | |
| 6,187,223 B1 | 2/2001 | Andou et al. | |
| 6,548,126 B1 * | 4/2003 | Sasada et al. | 428/1.1 |
| 6,919,944 B2 * | 7/2005 | Maeda | 349/113 |
| 6,969,542 B2 * | 11/2005 | Klasen-Memmer et al. | 428/1.1 |
| 2008/0017830 A1 * | 1/2008 | Takeda | 252/299.1 |

FOREIGN PATENT DOCUMENTS

| | | |
|---|---|---|
| JP | 3-287288 | 12/1991 |
| JP | 05-051332 | 3/1993 |
| JP | 05-085972 | 4/1993 |
| JP | 3718890 | 4/2001 |

* cited by examiner

*Primary Examiner*—Geraldina Visconti
(74) *Attorney, Agent, or Firm*—Antonelli, Terry, Stout & Kraus, LLP.

(57) ABSTRACT

The present invention is intended to provide a liquid crystal display device excellent in moving picture characteristics in view of the temperature dependence of the viscosity of a liquid crystal composition. In the present invention, one or more compounds having the following structure are used in the liquid crystal composition in the liquid crystal display device having a predetermined structure (in the following formula, each of $X_1$ and $X_2$ is an alkyl group, an alkenyl group, an alkoxy group, an alkenyloxy group, a substituent formed by fluorination of any of these groups, a halogen atom, a cyano group, a nitro group or an isothiocyano group; Ps are independently a fluorine atom, a hydrogen atom or an alkyl group; A and B are independently —$CF_2O$—, —$CH_2CH_2$—, —$CH_2O$— or —$CF_2$—$CH_2$— which have a structure comprising single bonds; each of $Z_1$, $Z_2$ and $Z_3$ is a molecular group comprising a 6-membered ring and selected from a benzene ring, a cyclohexane ring, a fluorinated benzene ring and a fluorinated cyclohexane ring; each of m and o is 0 or 1; and n is 1 or 2):

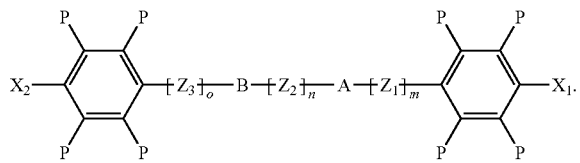

10 Claims, 6 Drawing Sheets

LIQUID CRYSTAL DISPLAY DEVICE

BACKGROUND OF THE INVENTION

The present invention relates to a liquid crystal material, more particularly, a liquid crystal display device improved in moving picture quality.

In liquid crystal display devices, an electric field is applied to liquid crystal molecules in a liquid crystal layer inserted between a pair of substrates and a display is given by utilizing a change in the optical properties of the liquid crystals caused by a change in the direction of orientation of the liquid crystal molecules caused by the application of the electric field. Such liquid crystal display devices are commonly used as the display portions of large-sized liquid crystal TV, monitors for PC, medium- or small-sized car navigation systems, mobile phones and PDA. However, a limited time is required for the change in the direction of orientation of the liquid crystal molecules after the application of the electric field. When this time (=response time) is long, the moving picture quality is deteriorated. This is considered a problem. Such a speed of response is affected by a structure chosen as that of a liquid crystal composition constituting the liquid crystal layer. That is, when a liquid crystal composition having a high viscosity is used, the speed of response is low. On the other hand, when a liquid crystal composition having a low viscosity is used, the speed of response is high.

The following patent document 1 and patent document 2 disclose the structures of liquid crystal compositions which are suitable for display devices from the viewpoint of various characteristics required of a liquid crystal display element. In patent document 1, liquid crystal compounds are chosen from the viewpoint of the extension of mesomorphic range, low viscosity, low threshold voltage, high stability and the improvement of compatibility with other liquid crystal compounds, and their chemical structures are listed. In patent document 2, liquid crystal compounds are chosen which improve low-voltage driving, high-precision display, high contrast ratio, high visual angle characteristics, low-temperature response characteristics and the like, and the employment of a liquid crystal composition having a low viscosity is described for improving, in particular, the speed of response.

Patent document 1: Japan Patent No. 3287288
Patent document 2: Japan Patent No. 3178890

The viscosity of the above-mentioned liquid crystal composition has exponential temperature dependence and increases with a lowering of temperature. Therefore, the speed of response of the liquid crystals is also affected by a temperature change. In recent years, liquid crystal display devices such as portable or on-vehicle displays are often used in a circumstance of various temperatures. Accordingly, in order to investigate the moving picture quality of the liquid crystal display devices, it is necessary to investigate not only the improvement of the speed of response but also the temperature dependence of the speed of response. In the above-mentioned patent documents 1 and 2, the most suitable structure of the liquid crystal composition is not chosen in relation to the temperature dependence of the viscosity of the liquid crystal composition.

Such temperature dependence of the viscosity of the liquid crystal composition becomes a more important problem when the employment of the composition in a device is investigated. In a recent liquid crystal display device for TV, the quantity of heat generated by a backlight is increased because the size of the display screen is increased and the brightness is increased by increasing the amount of light emitted by the backlight. Therefore, it is difficult to make the temperature in the liquid crystal display screen uniform, so that a temperature distribution exists in a plane of the liquid crystal layer. In order to use light-emitting diodes (LED) as a backlight in place of a cold-cathode tube, a technique for dimming and controlling a plurality of LEDs as point light sources independently has been proposed. When the technique for thus controlling the backlight in each region is adopted, the following problem is caused: the temperature distribution in a plane of the liquid crystal layer becomes remarkable, so that the speed of response is changed in every region in the display screen in the case of a liquid crystal composition having much temperature dependence, resulting in a deteriorated moving picture display.

The speed of response τ of the device is proportional to the product of the viscosity η of the liquid crystal composition and (the thickness of the liquid crystal layer d)$^2$ when the temperature dependence of the elastic constant is neglected. In a liquid crystal display device having a multi-gap structure in which the thickness of a color filter film is different for pixels for different colors, i.e., red, green and blue, or a semi-transmission type liquid crystal display device in which the thickness values of a liquid crystal layer in a reflection portion and a transmission portion, respectively, are made different in order to adjust optical characteristics in these portions, the speed of response is different in regions different in the thickness of the liquid crystal layer. If the viscosity of the liquid crystal composition changes markedly with temperature, such a liquid crystal display device is disadvantageous in that moving picture characteristics in each region change markedly with temperature.

The above-mentioned problems, i.e., the partial deterioration of the moving picture quality by the temperature non-uniformity in the display screen and the widening of the difference in moving picture quality between regions different in the thickness of the liquid crystal layer during low-temperature operation, are caused by the temperature dependence of the response time, i.e., the temperature dependence of the viscosity of a liquid crystal material. A means for solving these problems has not yet been found. These problems are common to all liquid crystal display devices in which a display is given by the use of the electrooptical characteristics of a liquid crystal material, such as liquid crystal display devices in which an electrode is located on each of upper and lower substrates and an electric field substantially perpendicular to the substrate surface is applied and which are represented by liquid crystal display devices according to the twisted nematic (TN) method, vertical alignment (VA) method or electrically controlled birefringence (ECB) method; and liquid crystal display devices according to in-plane switching (IPS) method, a display method in which an inter digital electrode is located on one of upper and lower substrates, the direction of application of an electric field is made substantially parallel to the in-plane direction of the substrate and the change of the birefringence of liquid crystals is utilized.

An object of the present invention is to attain a good moving picture quality as follows irrespective of a liquid crystal display method such as VA method or IPS method: when the response time of liquid crystals is different in different pixels or nonuniform in one and the same pixel, as in a liquid crystal display device in which the thickness of a liquid crystal layer is different in different pixels or nonuniform in one and the same pixel, a difference in the response time made by a temperature lowering is reduced, or the temperature dependence of the response time is reduced which is observed as a difference in the response time between a high-temperature portion and a low-temperature portion made when the surface temperature of the display screen of the liquid crystal display device is not uniform.

SUMMARY OF THE INVENTION

The present invention has the following constitution in order to solve the problems described above.

The fundamental structure of the liquid crystal display device of the present invention is as follows: a liquid crystal material is held between a pair of glass substrates, and liquid crystal display elements having as components formed thereon an active element formed of thin-film TFT, wirings for driving the active element and electrodes are formed in array on at least one of the surfaces of the glass substrates which face each other.

The constitution of a first aspect of the invention is as follows: in the case of the liquid crystal display elements, the thickness of the liquid crystal layer in the direction perpendicular to the substrate surface is not uniform in a region where the optical characteristics of the liquid crystal material are actually modulated, such as a region transmitting environmental light or external light from an illuminator such as a cold-cathode tube, or the thickness of the liquid crystal layer in the direction perpendicular to the substrate surface is not uniform in a region where the optical characteristics of the liquid crystal material are actually modulated in the liquid crystal display elements which are adjacent to and independent of one another, such as liquid crystal display elements capable of displaying any of red, blue and green colors. The liquid crystal layer of such a liquid crystal display device contains one or more compounds represented by the formula 1. In the formula 1, each of $X_1$ and $X_2$ is an alkyl group, an alkenyl group, an alkoxy group, an alkenyloxy group, a substituent formed by fluorination of any of these groups, a halogen atom, a cyano group, a nitro group or an isothiocyano group; Ps are independently a fluorine atom, a hydrogen atom or an alkyl group; A and B are independently —$CF_2O$—, —$CH_2CH_2$—, —$CH_2O$— or —$CF_2$—$CH_2$— which have a structure comprising single bonds; each of $Z_1$, $Z_2$ and $Z_3$ is a molecular group comprising a 6-membered ring and selected from a benzene ring, a cyclohexane ring, a fluorinated benzene ring and a fluorinated cyclohexane ring; each of m and o is 0 or 1; and n is 1 or 2:

Formula 1

The reason why the compound(s) having such a molecular structure is chosen is that as a result of earnest investigation, it has been proved that the temperature dependence of response is reduced when a cross-linked structure is selected from structures comprising single bonds, i.e., —$CF_2O$—, —$CH_2CH_2$—, —$CH_2O$— and —$CF_2$—$CH_2$—. However, it has also been proved that in the case of the cross-linked structure comprising single bonds, the nematic-isotropic transition temperature indicating liquid crystallinity is lowered. Therefore, in order to achieve both the reduction of the temperature dependence of response and the improvement of the liquid crystallinity, the structure of the compound used in the present invention is characterized in that as shown in the formula 1, it has a cross-linked structure comprising single bonds and selected from —$CF_2O$—, —$CH_2CH_2$—, —$CH_2O$— and —$CF_2$—$CH_2$—. in each of two portions A and B in the molecule. The cross-linked structure referred to here is not a structure bonded to the end of a molecular structure but a molecular structure connecting independent two benzene rings or cyclohexane rings or connecting molecular groups formed by the replacement of a hydrogen atom(s) on either of these rings by a fluorine atom(s).

More specifically, the following structures having a positive $\Delta\epsilon$ value are preferable when IPS method, TN method or the like is adopted. In this case, $X_1$ is an alkyl group, an alkenyl group, an alkoxy group, an alkenyloxy group, a substituent formed by fluorination of any of these groups, a halogen atom, a cyano group, a nitro group or an isothiocyano group, and Ps are independently a fluorine atom, a hydrogen atom or an alkyl group.

Formula 4

Formula 5

Formula 6

Formula 7

Formula 8

Formula 9

-continued

Formula 10

Formula 11

When VA method or the like is adopted, the following structures having a negative $\Delta\epsilon$ value are preferable:

Formula 12

Formula 13

Formula 14

Formula 15

Also by choosing P, $X_1$ and $X_2$ according to the present invention in a structure represented by the formula 1 which is other than the above structures, a $\Delta\epsilon$ value suitable for a display method such as IPS, TN, ECB or VA can be attained and the temperature dependence of the response time can be improved irrespective of the display method. From the viewpoint of the optical characteristics of a common liquid crystal display element, the thickness of the liquid crystal layer is preferably set so that the product of the refractive index anisotropy of the liquid crystal material and the thickness of the liquid crystal layer may be 0.24 to 0.5.

Furthermore, in the constitutions of second and third aspects of the invention, the thickness of the liquid crystal layer in the above-mentioned liquid crystal display element is controlled by the thickness of a color filter in relation to the first aspect of the invention. Since the response time is different in regions different in the thickness of the liquid crystal layer, the difference in response time is widened by a temperature change, in particular, a temperature lowering.

Therefore, in a fourth aspect of the invention, when at least the thickness values of a liquid crystal layer not uniform in thickness in a liquid crystal display element are taken as d1 and d2, respectively, the relationship between these thickness values and the optical response time T between black and white at d1 is defined by the following expression deduced from the result of subjective estimation:

$d2/d1 \geq \sqrt{(0.34/\tau + 1)}$

In the first aspect of the invention, the compound(s) represented by the formula 1 is contained as a first component in the liquid crystal layer. On the other hand, a fifth aspect of the invention is characterized in that the liquid crystal layer contains as a second component a compound satisfying the inequality $|\Delta\epsilon| \leq 2$ and having a molecular weight of 250 or less. As such a compound, a compound represented by the formula 3 is preferable. More specifically, preferable is a liquid crystal compound having a biphenyl structure, a phenylcyclohexane skeleton or a bicyclohexane skeleton, satisfying the inequality $|\Delta\epsilon| \leq 2$ and having a molecular weight of 250 or less.

(In the formula 3, each of $X_1$ and $X_2$ is an alkyl group, an alkenyl group, an alkoxy group, an alkenyloxy group, a substituent formed by fluorination of any of these groups, a halogen atom, a cyano group, a nitro group or an isothiocyano group, and each of $Z_1$ and $Z_2$ is a molecular group comprising a 6-membered ring and selected from a benzene ring, a cyclohexane ring, a fluorinated benzene ring and a fluorinated cyclohexane ring.)

$X_2\text{-}Z_2\text{-}Z_1\text{-}X_1$      Formula 3

Figure 1:
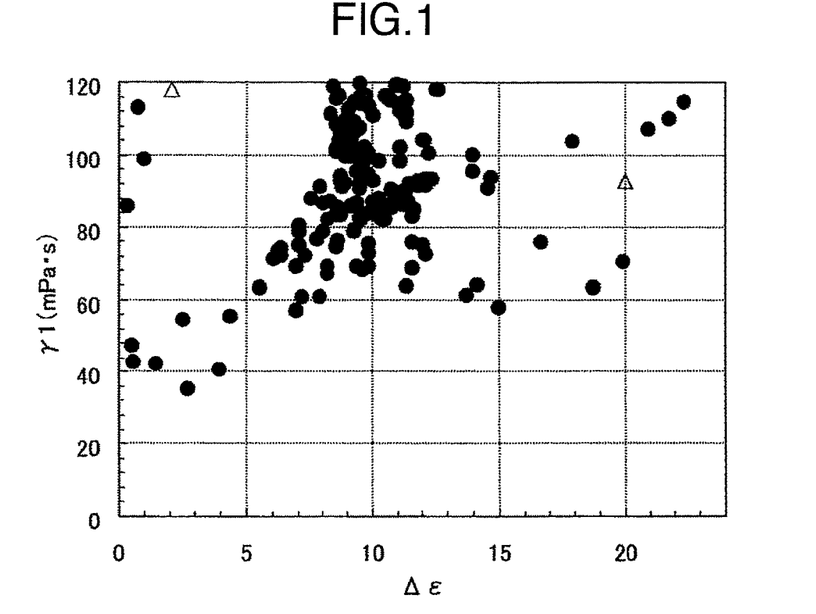
FIG. 1 is a graph illustrating the relationship between the viscosity and $\Delta\epsilon$ of a liquid crystal material.

FIG. 1 is a graph showing the relationship between the viscosity and $\Delta\epsilon$ of a liquid crystal compound or a liquid crystal composition. In FIG. 1, the plot shown by $\Delta$ indicates physical properties of compounds having a typical example of the structure specified in the first aspect of the invention. These compounds have a viscosity of about 100 mPa·sec. On the other hand, the viscosity of liquid crystal compounds and liquid crystal compositions in the case of the plot shown by ● tends to decrease with a decrease of $\Delta\epsilon$, and the viscosity is decreased substantially to the utmost limit when $|\Delta\epsilon| \leq 2$. That is, by combining the compound having a typical example of the structure specified in the first aspect of the invention with the liquid crystal compound satisfying the inequality $|\Delta\epsilon| \leq 2$, the viscosity of the resulting composition can be reduced most efficiently.

Figure 2:
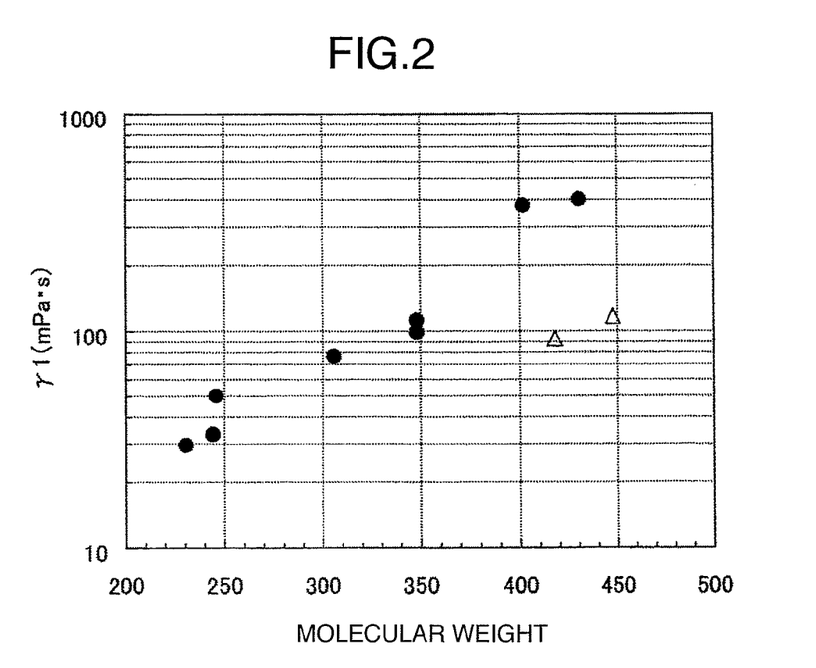
FIG. 2 is a graph illustrating the relationship between the molecular weight and viscosity of a liquid crystal material.

In addition, FIG. 2 shows the relationship between molecular weight and viscosity. In FIG. 2, ● indicates liquid crystal compounds satisfying the inequality $|\Delta\epsilon| \leq 2$, and $\Delta$ indicates compounds having a typical example of the structure specified in the first aspect of the invention. From the results shown in FIG. 2, it can be seen that compounds having a viscosity decreased substantially to the utmost limit when $|\Delta\epsilon| \leq 2$ are compounds having a molecular weight of 250 or less. Therefore, in a liquid crystal composition containing the compound(s) described in the first aspect of the invention, a compound satisfying the inequality $|\Delta\epsilon| \leq 2$ and having a molecular weight of 250 or less is preferable as a second component.

A sixth aspect of the invention is characterized in that the liquid crystal layer contains at least one compound having a structure represented by the formula 2 as a specific example of the compound having the structure represented by the formula 1 which is contained as a first component in the liquid crystal layer. In the formula 2, each of $X_1$ and $X_2$ is an alkyl group, an alkenyl group, an alkoxy group, an alkenyloxy group, a substituent formed by fluorination of any of these groups, a halogen atom, a cyano group, a nitro group or an isothiocyano group, and Ps are independently a fluorine atom, a hydrogen atom or an alkyl group.

Formula 2

The constitution of a seventh aspect of the invention is characterized as follows: it comprises a pair of substrates, a liquid crystal layer located between the pair of the substrates, a group of electrodes located on at least one of the pair of the substrates and capable of applying an electric field to the liquid crystal layer, and a polarizing plate located on at least one of the pair of the substrates; a liquid crystal composition constituting the liquid crystal layer contains one or more compounds represented by the formula 1; a reflector plate is located on one of the pair of the substrates; and a reflection region and a transmission region are formed in each pixel. In the formula 1, each of $X_1$ and $X_2$ is an alkyl group, an alkenyl group, an alkoxy group, an alkenyloxy group, a substituent formed by fluorination of any of these groups, a halogen atom, a cyano group, a nitro group or an isothiocyano group; Ps are independently a fluorine atom, a hydrogen atom or an alkyl group; A and B are independently —$CF_2O$—, —$CH_2CH_2$—, —$CH_2O$— or —$CF_2$—$CH_2$— which have a structure comprising single bonds; each of $Z_1$, $Z_2$ and $Z_3$ is a molecular group comprising a 6-membered ring and selected from a benzene ring, a cyclohexane ring, a fluorinated benzene ring and a fluorinated cyclohexane ring; each of m and o is 0 or 1; and n is 1 or 2:

Formula 1

In addition, an eighth aspect of the invention is characterized in that the above-mentioned reflector plate functions as an electrode. A ninth aspect of the invention is characterized in that the liquid crystal layer is formed so as to be thinner in the reflection region than in the transmission region. From the viewpoint of the optical characteristics of a common liquid crystal display element, the thickness of the liquid crystal layer is preferably set so that the product of the refractive index anisotropy of the liquid crystal material and the thickness of the liquid crystal layer in the transmission region may be 0.24 to 0.5 and that the product of the refractive index anisotropy of the liquid crystal material and the thickness of the liquid crystal layer in the reflection region may be 0.12 to 0.25. A tenth aspect of the invention is characterized in that the liquid crystal layer in the above-mentioned reflection region is controlled by the thickness of an insulating film located on one of the pair of the substrates so as to face the substrate surface.

In an eleventh aspect of the invention, when at least the different thickness values of the liquid crystal layer in the above-mentioned transmission region and reflection region, respectively, in a liquid crystal display element are taken as d1 and d2, respectively, the relationship between these thickness values and the optical response time τ between black and white at d1 is defined by the following expression:

$$d2/d1 \geq \sqrt{(0.34/\tau+1)}$$

A twelfth aspect of the invention is characterized in that a compound satisfying the inequality $|\Delta\epsilon| \leq 2$ and having a molecular weight of 250 or less is contained as a second component. As such a compound, a compound represented by the formula 3 is preferable. More specifically, preferable is a liquid crystal compound having a biphenyl structure, a phenylcyclohexane skeleton or a bicyclohexane skeleton, satisfying the inequality $|\Delta\epsilon| \leq 2$ and having a molecular weight of 250 or less.

(In the formula 3, each of $X_1$ and $X_2$ is an alkyl group, an alkenyl group, an alkoxy group, an alkenyloxy group, a substituent formed by fluorination of any of these groups, a halogen atom, a cyano group, a nitro group or an isothiocyano group, and each of $Z_1$ and $Z_2$ is a molecular group comprising a 6-membered ring and selected from a benzene ring, a cyclohexane ring, a fluorinated benzene ring and a fluorinated cyclohexane ring.)

$$X_2\text{-}Z_2\text{-}Z_1\text{-}X_1 \qquad \text{Formula 3}$$

A thirteenth aspect of the invention is characterized in that the liquid crystal layer contains at least one compound having a structure represented by the formula 2 as a specific example of the compound having the structure represented by the formula 1 which is contained as a first component in the liquid crystal layer. In the formula 2, each of $X_1$ and $X_2$ is an alkyl group, an alkenyl group, an alkoxy group, an alkenyloxy group, a substituent formed by fluorination of any of these groups, a halogen atom, a cyano group, a nitro group or an isothiocyano group, and Ps are independently a fluorine atom, a hydrogen atom or an alkyl group.

Formula 2

The constitution of a fourteenth aspect of the invention is characterized as follows: it comprises a pair of substrates, a liquid crystal layer located between the pair of the substrates, a group of electrodes located on at least one of the pair of the substrates and capable of applying an electric field to the liquid crystal layer, and a polarizing plate located on at least one of the substrates; one or more compounds represented by the formula 1 are contained as a first component; and one or more compounds represented by the formula 3 are contained as a second component.

In the formulas 1 and 3, each of $X_1$ and $X_2$ is an alkyl group, an alkenyl group, an alkoxy group, an alkenyloxy group, a substituent formed by fluorination of any of these groups, a halogen atom, a cyano group, a nitro group or an isothiocyano group; Ps are independently a fluorine atom, a hydrogen atom or an alkyl group; A and B are independently —$CF_2O$—, —$CH_2CH_2$—, —$CH_2O$— or —$CF_2$—$CH_2$— which have a structure comprising single bonds; each of $Z_1$, $Z_2$ and $Z_3$ is a molecular group comprising a 6-membered ring and selected from a benzene ring, a cyclohexane ring, a fluorinated benzene ring and a fluorinated cyclohexane ring; each of m and o is 0 or 1; and n is 1 or 2:

Formula 1

Formula 3

$X_2$—$Z_2$—$Z_1$—$X_1$

The constitution of a fifteenth aspect of the invention is characterized as follows: it comprises a liquid crystal panel comprising a pair of substrates, a liquid crystal layer located between the pair of the substrates, a group of electrodes located on at least one of the pair of the substrates and capable of applying an electric field to the liquid crystal layer, and a polarizing plate located on at least one of the substrates, and a member for illumination which supplies light to the liquid crystal panel; and a liquid crystal composition constituting the liquid crystal layer contains one or more compounds of the formula 1. In the formula 1, each of $X_1$ and $X_2$ is an alkyl group, an alkenyl group, an alkoxy group, an alkenyloxy group, a substituent formed by fluorination of any of these groups, a halogen atom, a cyano group, a nitro group or an isothiocyano group; Ps are independently a fluorine atom, a hydrogen atom or an alkyl group; A and B are independently —$CF_2O$—, —$CH_2CH_2$—, —$CH_2O$— or —$CF_2$—$CH_2$— which have a structure comprising single bonds; each of $Z_1$, $Z_2$ and $Z_3$ is a molecular group comprising a 6-membered ring and selected from a benzene ring, a cyclohexane ring, a fluorinated benzene ring and a fluorinated cyclohexane ring; each of m and o is 0 or 1; and n is 1 or 2:

Formula 1

In addition, a sixteenth aspect of the invention is characterized in that in the above-mentioned member for illumination or a box holding the member for illumination, a fan, an air-cooled heat sink, a heat pipe or a liquid-cooled heat sink is located which are for exhausting heat generated by the member for illumination. A seventeenth aspect of the invention is characterized in that the above-mentioned member for illumination comprises a plurality of light sources the luminance values of which can be independently controlled. It is supposed that as such light sources, cold-cathode tubes, inorganic light-emitting diodes or organic light-emitting diodes, which have been conventionally used as light sources in liquid crystal display devices, are located in array in a plane. However, in the case of such a structure, the temperature in the surface of the display device tends to be nonuniform. Therefore, it is preferable to incorporate the above-mentioned liquid crystal compound into the liquid crystal layer and exhaust heat generated by the member for illumination.

According to the present invention, a good moving picture quality can be attained as follows irrespective of a liquid crystal display method such as VA method or IPS method: when the response time of liquid crystals is different in different pixels or nonuniform in one and the same pixel, as in a liquid crystal display device in which the thickness of a liquid crystal layer is different in different pixels or nonuniform in one and the same pixel, a difference in the response time made by a temperature lowering is reduced, or a difference in the response time between a high-temperature portion and a low-temperature portion is reduced which is made when the surface temperature of the display screen of the liquid crystal display device is not uniform.

DESCRIPTION OF REFERENCE NUMERALS

101—glass substrate, 102—common electrode wiring, 103, 219—common electrode, 104—scanning electrode, 105—pixel electrode, 106—signal electrode, 107—insulating film, 108, 254, 255, 257—protective film, 109, 250—alignment film, 110, 221—liquid crystal layer, 111, 217—color filter, 113—light shutting-out film, 114, 311—polarizing plate, 115—electric line of force, 116—semiconductor film, 117—thin-film transistor, 118—pixel electrode wiring, 201—signal wiring, 202—scanning wiring, 203—support pillar, 204, 209, 245—reflection portion, 205—first transmission portion, 206—transparent electrode, 207—first linear dielectric projection, 208—second transmission portion, 210—second linear dielectric projection, 211—uneven structure, 212—through-hole contact, 213—pixel pitch, 214—first substrate, 215—second substrate, 216, 246—light shutting-out layer, 218—overcoat film, 220—liquid crystal molecule, 223—inversely tilted-up region, 224—domain wall, 225—display portion, 226—liquid crystal driver LSI, 227—flexible printed circuit board, 228—backlight, 229—first polarizing plate, 230—first A plate, 231—first negative C plate, 232—LCD cell, 233—second negative C plate, 234—second A plate, 235—second polarizing plate, 236—the axis of absorption of the first polarizing plate, 237—the axis of slow phase of the first A plate, 238—the axis of slow phase of the second A plate, 239—the axis of absorption of the second polarizing plate, 240—reflecting electrode, 241—joint, 242—electrode slit, 243—linear dielectric projection, 244—linear dielectric projection in pixel, 247—level difference structure in the reflection portion, 248—portion freed from the color filter, 249—contact area between the reflection electrode and the transparent electrode, 251—coating type insulating film, 252—common electrode, 253—source electrode, 256—gate insulating film, 258—polycrystalline silicon layer, 259—protective film 254 patterning position, 301—IPSLCD, 302—diffusing plate, 303—backlight module, 304—cold-cathode tube, 305—mirror sheet, 306—box, 307—forced-cooling apparatus (fan), 308 inverter, 309—controller, 310—spacer.

DETAILED DESCRIPTION OF THE INVENTION

A liquid crystal display device using transmission type IPSLCD is explained below as an example of embodiment of the present invention with reference to the drawings. A substrate having active elements (e.g. thin-film transistors) formed thereon is hereinafter referred to as an active-matrix substrate. When a substrate facing the above-mentioned substrate has a color filter, it is referred to also as a color filter substrate.

Figure 3A:
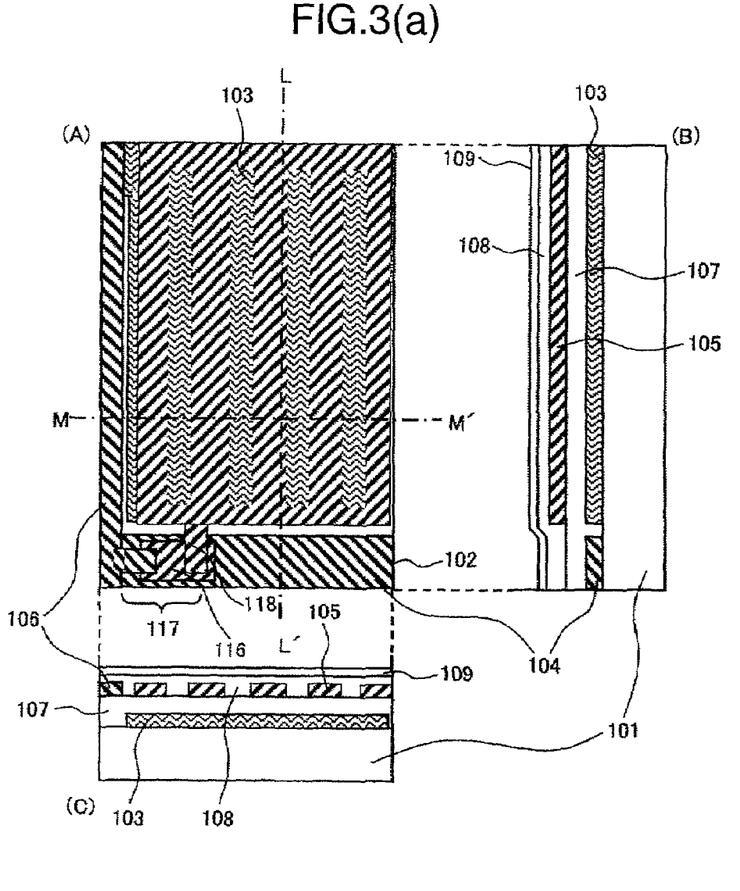
FIGS. 3(a) and 3(b) are diagrams illustrating the structure of the pixel in the liquid crystal display devices of Examples 1 and 2.
Figure 3B:
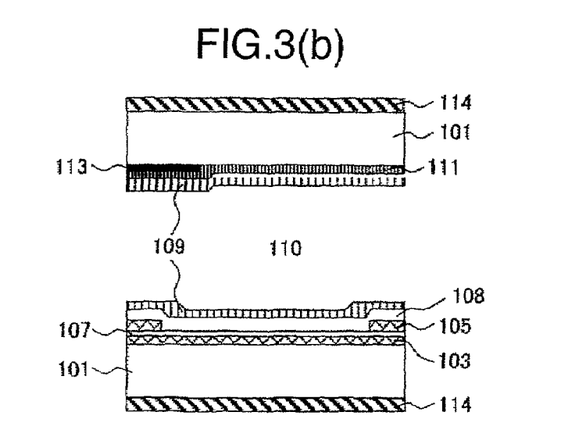

FIG. 3(a) and FIG. 3(b) are schematic cross-sectional views of a pixel which illustrate embodiments carried out in Examples 1 and 2. FIG. 3(a)-(A) is a plan view, FIG. 3(a)-(B) is a sectional view taken along the line L-L', and FIG. 3(a)-(C) is a sectional view taken along the line M-M'.

In the liquid crystal display device according to the present embodiment, an active-matrix substrate is obtained as follows: as shown in FIG. 3, a common electrode 103 made of indium-tin-oxide (ITO) is located on a glass substrate 101, scanning electrodes (gate electrodes) 104 made of Mo/Al (molybdenum/aluminum) and a common electrode wiring 102 are formed so as to overlap with the common electrode 103, and an insulating film 107 made of silicon nitride is formed so as to cover the common electrode 103, the gate electrode 104 and the common wiring 102. A semiconductor film 116 made of amorphous silicon or polycrystalline silicon is located on the gate electrode 104 through the insulating film 107 so as to function as an active layer for a thin-film transistor (TFT) as active element. Signal electrodes (drain electrodes) 106 made of Cr.Mo (chromium/molybdenum) and a pixel electrode wiring 118 are located so as to overlap with a part of the pattern of the semiconductor film 116, and a protective film 108 made of silicon nitride is formed so as to cover all of the components described above.

ITO pixel electrodes 105 penetrating the protective insulating film 108 and connected to the metal (Cr.Mo) pixel electrode wiring 118 is located on the protective film 108.

As shown in FIG. 3(a), in plane, the common electrode 103 is formed in the form of a flat plate and the pixel electrodes 105 in the interdigital form, in the region of one pixel.

Thus, in the present embodiment, the common electrode 103 is located under the insulating film 107 under the protective film 108, and the pixel electrodes 105 are located on the insulating film 107. A pixel is composed of a region held between the pixel electrodes 105 and the common electrode 103. An alignment film 109 is formed on the surface of the active-matrix substrate having such unit pixels located thereon in the form of a matrix, i.e., the protective film 108 having the pixel electrodes 105 formed thereon.

On the other hand, as shown in FIG. 3(b), a color filter 111 is located on a glass substrate 101 that constitutes an opposite substrate, so as to be partitioned into individual sections for the pixels by a light shutting-out film (black-matrix) 113, and an alignment film 109 is formed on the color filter 111 and the light shutting-out film (black-matrix) 113 to constitute a color filter substrate. In this case, the thickness of the color filter is different for different colors, i.e., red, blue and green in order to increase the transmittance and color purity of pigments. As a result, the thickness of a liquid crystal layer is not uniform.

The active-matrix substrate and the glass substrate 101 constituting an opposite electrode are located so that the surfaces of their alignment films may face each other, and a liquid crystal layer 110 is located between them. A polarizing plate 114 is formed on the outer surface of the glass substrate 101 constituting each of the active-matrix substrate and the color filter substrate constituting the opposite electrode.

Thus, an active-matrix type liquid crystal display device (i.e., a TFT liquid crystal display device) using the thin-film transistors is constructed. In this TFT liquid crystal display device, when no electric field is applied, liquid crystal molecules in the liquid crystal layer 110 are oriented substantially parallel to the surfaces of the glass substrates 101 located so as to face each other, and are homogeneously oriented in the direction of initial orientation determined by optical alignment treatment. When a voltage is applied to the gate electrode 104 to switch on the thin-film transistors (TFT), an electric field is applied to the liquid crystal composition layer owing to the potential difference between the pixel electrodes 105 and the common electrode 103, so that liquid crystal molecules in the liquid crystal layer 110 constituting the liquid crystal composition layer turn to the direction of the electric field owing to the interaction between the dielectric anisotropy of the liquid crystal composition and the electric field. In this case, a display can be given by varying the light transmittance of the liquid crystal display device by utilizing the refraction anisotropy of the liquid crystal composition layer and the action of the polarizing plates 114.

EXAMPLE 1

A first working example is explained below in detail with reference to FIG. 3(a) and FIG. 3(b).

In the production of a liquid crystal display device as the first working example of the present invention, a 0.7-mm thick glass substrate having a polished surface was used as each of a glass substrate 101 that constitutes an active-matrix substrate and another glass substrate 101 that constitutes an opposite substrate (a color filter substrate). Thin-film transistors 117 formed on the glass substrate 101 were composed of a pixel electrode wiring 118, a signal electrode 106, a scanning electrode 104 and a semiconductor film 116. A common electrode 103 and the pixel electrode wiring 118 were formed by patterning ITO, and all of the scanning electrode 104, a common electrode wiring 102 and the signal electrode 106 were formed by patterning a chromium film. An insulating film 107 and a protective film 108 were made of silicon nitride and the thickness of each of them was adjusted to 0.3 µm.

Then, through-holes were formed as far as the pixel electrode wiring 118 by photolithography and etching treatment, and ITO pixel electrodes 105 to be connected to the pixel electrode wiring 118 were formed in the form of the teeth of a comb by pattering. The distance between the inter digital electrodes as the pixel electrodes 105 was adjusted to 5 µm. In the formation of the ITO pixel electrodes 105, an electrode thin film having an electrode thickness (x) of about 70 nm was formed. Such pixels were constructed in array from signal electrodes 106 in a number of 1024×3 (corresponding to R, G and B) and 768 scanning electrodes 104 to form an active-matrix substrate having pixels in a number of 1024×3×768. Subsequently, a solution of polyamic acid varnish was formed by printing and baked at 220° C. for 30 minutes to form a polyimide alignment film of about 100 nm. Thereafter, an ability to control liquid crystal molecular orientation was imparted to the surface of the alignment film by rubbing operation.

Similarly, a columnar spacer was formed of a resin by photolithography and etching treatment on the surface of the other glass substrate 101 that constitutes an opposite substrate having a color filter formed thereon. The same polyamic acid varnish as in the case of the active-matrix substrate was formed by printing on the surface of the spacer and heat-treated at 220° C. for 30 minutes to form a polyimide alignment film 109 of about 100 nm. Then, an ability to control liquid crystal molecular orientation was imparted to the surface of the alignment film 109 by rubbing operation. On the glass substrate 101 which constitutes the opposite substrate having the color filter formed thereon, the average thickness values of portions of the color filter corresponding to the pixel portions for red, green and blue were adjusted to 2.2 μm, 2.0 μm and 2.2 μm, respectively, in view of spectra of pigments and color balance.

Then, the two glass substrates 101 were placed so that their surfaces each having the alignment film 109 having an ability to orient liquid crystal molecules might face each other, and the periphery of the resulting assembly was coated with a sealing compound to obtain an assembly to be made into a liquid crystal display device. The directions of liquid crystal molecular orientation of the two glass substrates were substantially parallel to each other and the angle between the direction of an applied electric field and the directions of liquid crystal molecular orientation was adjusted to 75°.

Compounds represented by the formulas 16 to 19 were synthesized as typical examples of the compounds described in the first aspect of the invention, and added to a commercial fluorinated liquid crystal composition mixture (Tni: 81.7° C., Δn: 0.083, Δε: 8.0, μ (20° C.): 31 cp) each in an amount of about 5% by weight, and the liquid crystal composition thus prepared (Tni: 74.4° C., Δn: 0.091, Δε: 8.1, μ (20° C.): 31 cp) was injected into the obtained assembly by vacuum enclosing.

In the present example, the four typical compounds were added each in an amount of 5%. Such addition is for improving the low-temperature compatibility. Therefore, practically, it is also possible to add any amount of a compound having the structure specified in the present invention. This addition brings about effects expected in the present invention.

The retardation (Δnd) of the liquid crystal display panel thus obtained was about 0.38 μm. The liquid crystal display panel was held between two polarizing plates 114. The polarizing plates 114 were located so that the axis of transmission of polarized light of one of the polarizing plates might be substantially parallel to the above-mentioned direction of liquid crystal molecular orientation and that the axis of transmission of polarized light of the other polarizing plate might be perpendicular to the above-mentioned direction of liquid crystal molecular orientation. Then, the assembly thus obtained was made into a module by connecting a driving circuit, a backlight and the like to the assembly, whereby an active-matrix type liquid crystal display device was obtained. In the present example, normally-close characteristics were attained which were such that a dark display was given at a low voltage and a light display at a high voltage.

Table 1 shows the result of measuring the response time in rising from white tone to black tone at 25° C. and −20° C. of the pixel for green and the pixels for red and blue of the liquid crystal display device, and the difference Δ in the response time between the pixel for green and the pixels for red and blue. The response time described in the present specification is defined as follows unless otherwise specified: in the diminution of luminance from a starting tone (a white tone in the present example) to an ultimate tone (a black tone in the present example), the luminance values of the starting tone and the ultimate tone are taken as 0% and 100%, respectively, and the response time is defined as a time required for the luminance to change from 10% to 90%.

TABLE 1

|  | 25° C. | −20° C. |
|---|---|---|
| Pixels for red and blue | 36.4 ms | 422 ms |
| Pixel for green | 40.0 ms | 465 ms |
| Δ | 3.6 ms | 43 ms |

Formula 16

Formula 17

Formula 18

Formula 19

COMPARATIVE EXAMPLE 1

In the same manner as in the case of the liquid crystal display device described in Example 1, an active-matrix substrate and an opposite substrate having a color filter formed thereon were produced and then assembled, after which a commercial fluorine-containing liquid crystal composition (Tni: 81.7° C., Δn: 0.083, Δε: 8.0, μ (20° C.): 31 cp) was injected into the assembly by vacuum enclosing. The retardation (Δnd) of the liquid crystal display panel thus obtained was about 0.35 μm. The liquid crystal display panel was held between two polarizing plates 114. The polarizing plates 114 were located so that the axis of transmission of polarized light of one of the polarizing plates might be substantially parallel to the above-mentioned direction of liquid crystal molecular orientation and that the axis of transmission of polarized light of the other polarizing plate might be perpendicular to the above-mentioned direction of liquid crystal molecular orientation. Then, the assembly thus obtained was made into a module by connecting a driving circuit, a backlight and the like to the assembly, whereby an active-matrix type liquid crystal display device was obtained.

Table 2 shows the result of measuring the response time in rising from white tone to black tone at 25° C. and −20° C. of the pixel for green and pixels for red and blue of the liquid crystal display device, and the difference Δ in the response time between the pixel for green and the pixels for red and blue.

TABLE 2

|  | 25° C. | −20° C. |
| --- | --- | --- |
| Pixels for red and blue | 36.8 ms | 567 ms |
| Pixel for green | 40.5 ms | 630 ms |
| Δ | 3.7 ms | 63 ms |

In both Comparative Example 1 and Example 1, since a difference in the thickness of the liquid crystal layer lies between the pixel for green and the pixels for red and blue, between which there is a difference in the thickness of the color filter, the response time of the pixel for green and that of the pixels for red and blue are different. In Comparative Example 1, although the difference in response time between the pixel for green and the pixels for red and blue is 3.7 ms at 25° C., it is widened to 63 ms at −20° C. As a result of visual evaluation, it was confirmed that the color reproducibility in moving picture display was deteriorated at a low temperature. On the other hand, in Example 1, it can be seen that although the difference in response time between the pixel for green and the pixels for red and blue is 3.6 ms, which is substantially the same as in Comparative Example 1, at 25° C., it is improved to 43 ms at −20° C. In addition, the absolute values of the response time were also greatly improved at −20° C., and as a result of visual evaluation, it could be confirmed that the moving picture capability and the color reproducibility in moving picture display were improved. From the above results, the following can be seen: owing to the effect of the first aspect of the invention, the response time of each pixel in Example 1 is improved as compared with that in Comparative Example 1 and the temperature dependence of response is reduced in Example 1. It can also been seen that owing to the effects of the second to fourth aspects of the invention, the difference in response time between regions different in the thickness of the liquid crystal layer, such as that between the pixel for red and the pixel for green is improved in Example 1 as compared with Comparative Example 1.

EXAMPLE 2

In the same manner as in the case of the liquid crystal display device described in Example 1, an active-matrix substrate and an opposite substrate having a color filter formed thereon were produced and then assembled. Then, compounds represented by the formulas 2 and 3 were added as typical examples of the liquid crystal compound specified in the fifth aspect of the invention to the same liquid crystal composition as used in Example 1, each in an amount of about 10% by weight, and the liquid crystal composition thus prepared was injected into the assembly obtained above, by vacuum enclosing. The liquid crystal display panel thus obtained was held between two polarizing plates 114. The polarizing plates 114 were located so that the axis of transmission of polarized light of one of the polarizing plates might be substantially parallel to the above-mentioned direction of liquid crystal molecular orientation and that the axis of transmission of polarized light of the other polarizing plate might be perpendicular to the above-mentioned direction of liquid crystal molecular orientation. Then, the assembly thus obtained was made into a module by connecting a driving circuit, a backlight and the like to the assembly, whereby an active-matrix type liquid crystal display device was obtained.

Formula 20

Formula 21

As a result, it could be confirmed by the result of visual evaluation that fuzz and color reproducibility during moving picture display had been further improved as compared with Example 1.

EXAMPLE 3

The structure of a liquid crystal display device of a working example according to the seventh to thirteenth aspects of the invention is explained below with reference to FIG. 4, FIG. 5 and FIG. 6. Although ECB display method was chosen in Example 3 unlike in Example 1 in which IPS method was adopted, other display methods such as IPS method, VA method and TN method may be chosen.

Figure 4:
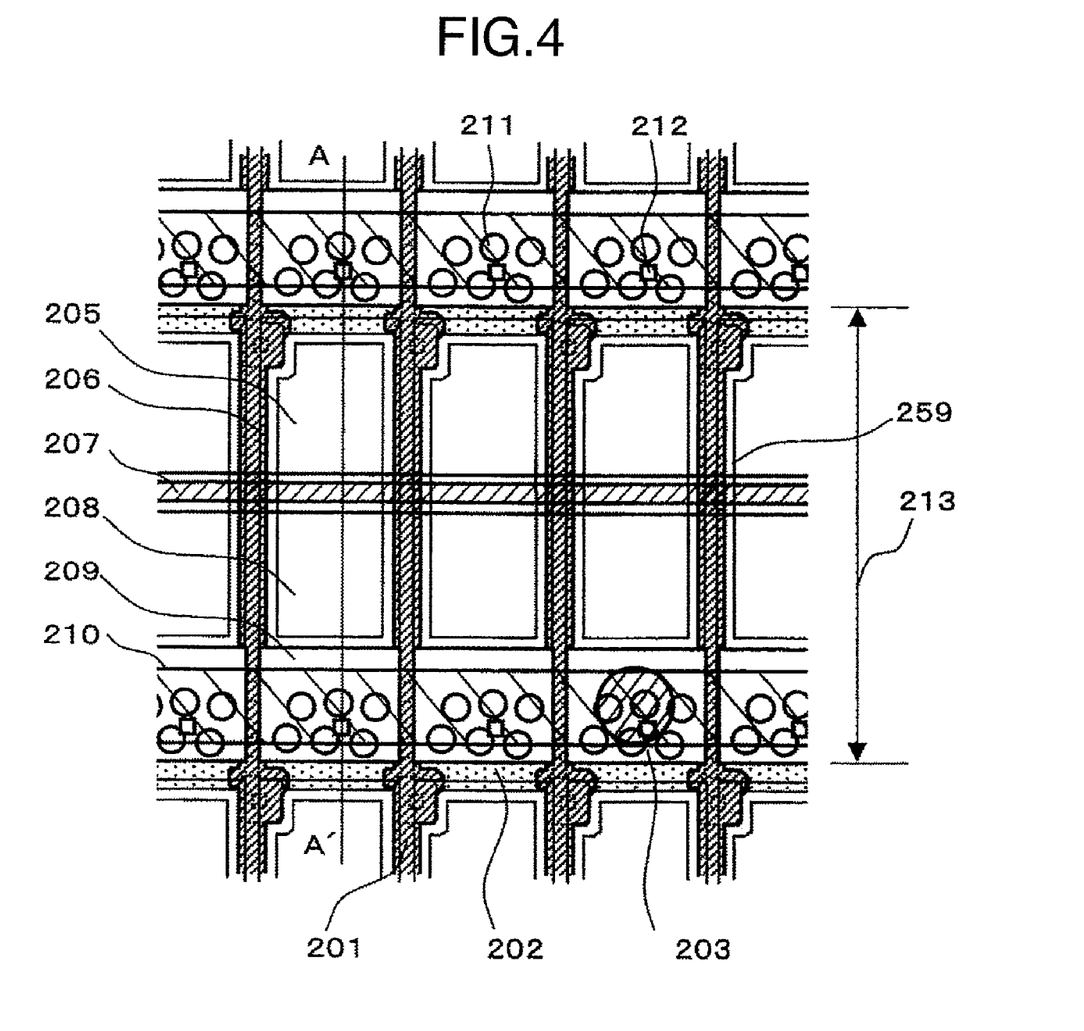
FIG. 4 is a diagram illustrating the structure of the pixel in the liquid crystal display devices of Examples 3 and 4.

FIG. 4 is a plan view of the liquid crystal display device of the present example, which includes three pixels and their peripheral regions in a display region where pixels are located in the form of a matrix.

Figure 5:
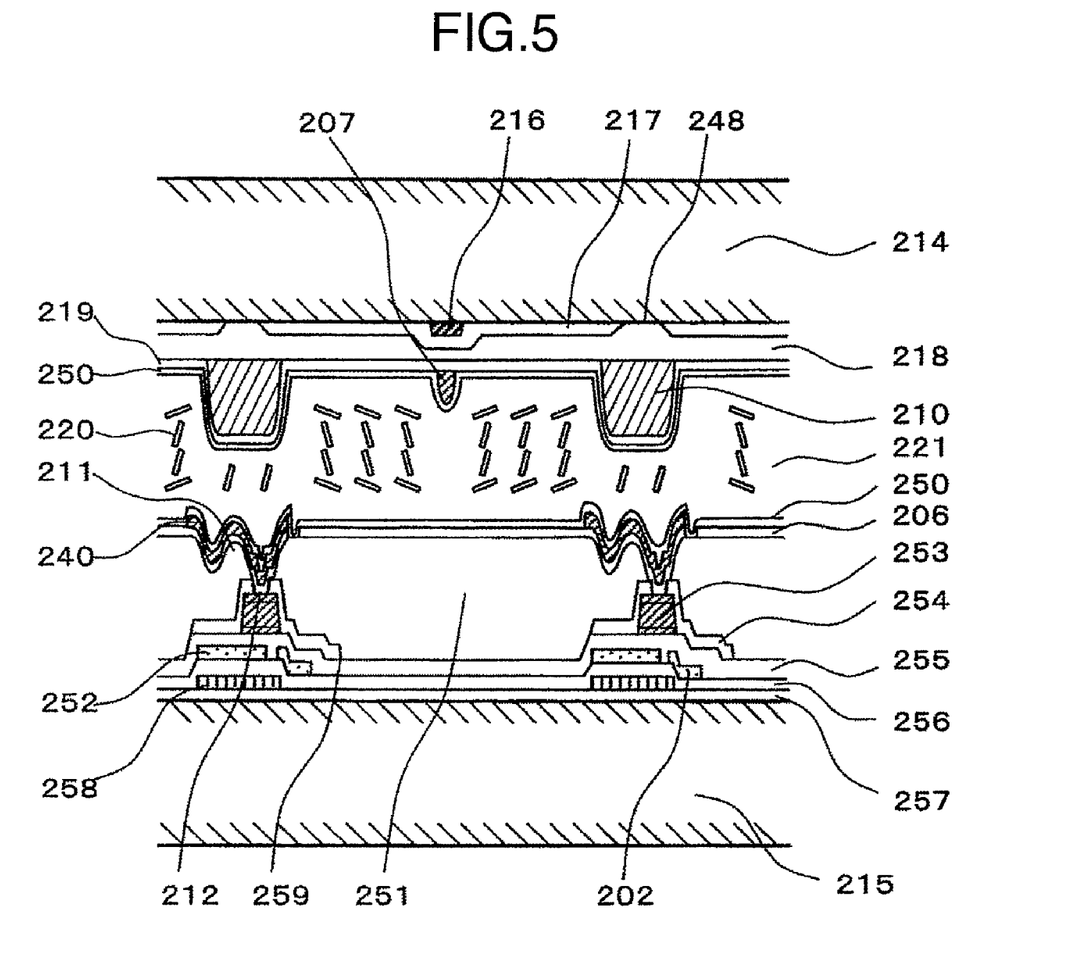
FIG. 5 is a cross-sectional view of the liquid crystal display devices of Examples 3 and 4.
Figure 6A:
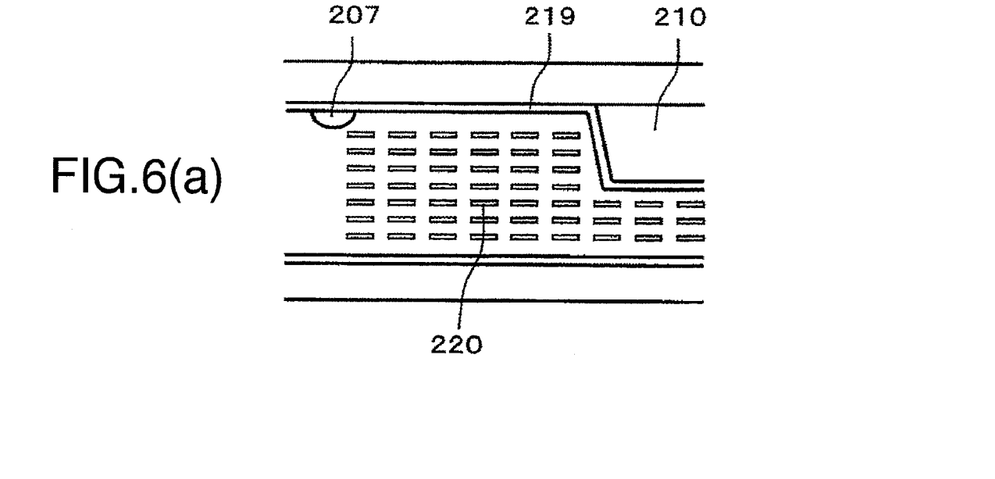
FIGS. 6(a), 6(b) and 6(c) are cross-sectional views illustrating oriented state in the liquid crystal display devices of Examples 3 and 4.
Figure 6B:
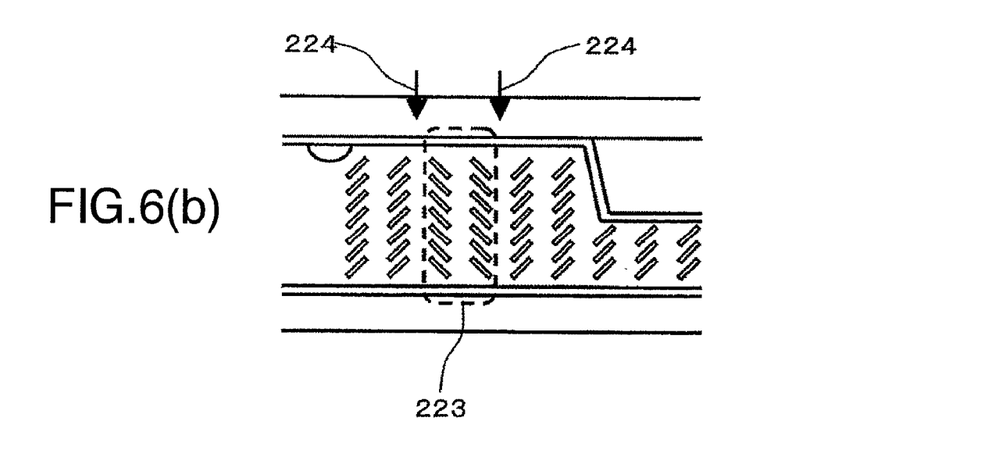
Figure 6C:
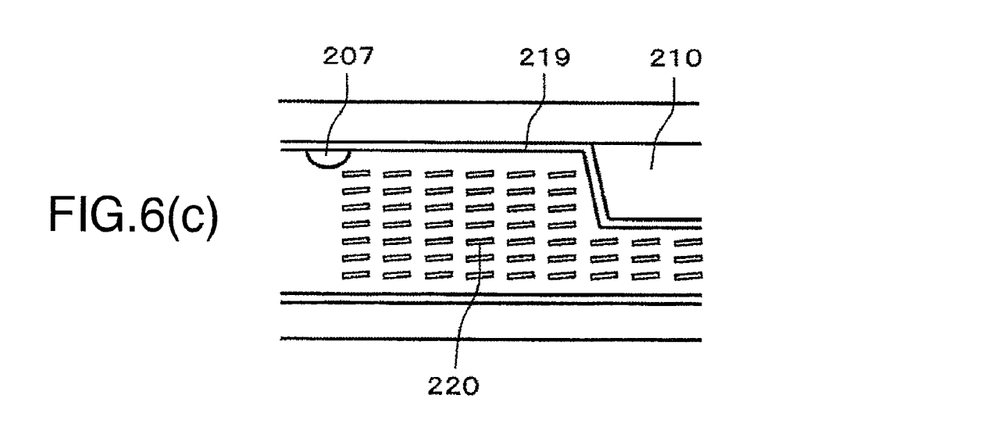

FIG. 5 is a sectional view taken along the line A-A' of FIG. 4.

The plan view as FIG. 4 shows the location of the following: a backlight (not shown), a second substrate 215, a liquid crystal layer 221 and a first substrate 214 which are located in that order in the direction from the background to the foreground.

The first substrate 214 has the following components formed thereon: a light shutting-out layer 216, a color filter 217, an overcoat film 218, first linear dielectric projections 207, second linear dielectric projections 210 and a common electrode 219.

The second substrate 215 has the following components formed thereon: a signal wiring 201, a scanning wiring 202, switching elements, protective films 254, 255 and 257, a gate insulating film 256, a coating type insulating film 251, source electrodes 253, a common electrode 252, transparent electrodes 206 and reflecting electrodes 240.

In FIG. 4, a color filter 111 is omitted for simplification.

The surface of each of the first substrate 214 and the second substrate 215 has an alignment film 250 for orienting liquid crystal molecules 220, as a film formed thereon, and a liquid crystal display device is formed by inserting a liquid crystal layer 221 between these substrates.

Pixels are located in sections, respectively, formed by the crossing of the signal wiring 201 by the scanning wiring 202, and numeral 213 indicates a pixel pitch in the direction of the long side of the pixel.

The pixel pitch in the direction of the short side of the pixel is one-third the pixel pitch 213 in the direction of the long side of the pixel.

Each pixel has the following portions formed therein: a transmission portion that displays an image by transmitting and modulating illumination light from the backlight (not shown), and a reflection portion that displays an image by reflecting and modulating external light.

The transmission portion of each pixel has a transparent electrode 206 and is divided into two regions, i.e., a first transmission portion 205 and a second transmission portion 208 with the first linear dielectric projection 207 inserted between them.

The first linear dielectric projection 207 is located over the first substrate 214 and between the common electrode 219 and the liquid crystal layer 221 so as to stretch over a plurality of pixels in the direction of the short side of the pixel and in parallel with the scanning wiring 202.

The reflection portion 209 has an uneven structure 211 formed therein for controlling the reflection and scattering characteristics of external light.

Each reflection portion has the reflecting electrode 240 formed thereon from a metal film composed mainly of aluminum having a high reflectance.

The reflection portion 209 has a through-hole contact 212, and the reflecting electrode 240 and the transparent electrode 206 are connected to the source electrode 253 located under them.

A support pillar 203 is a structure for controlling the thickness of the liquid crystal layer to make it uniform.

A portion of the first substrate 214 corresponding to the reflection portion has the second linear dielectric projection 210 formed over the former portion, and the second linear dielectric projection 210 controls the thickness of the liquid crystal layer 221 in the reflection portion at about one-half of that in the transmission portion. In the present example, the liquid crystal layer 221 was formed so that its thickness in the transmission portion might be 4 μm, and the same liquid crystal material as used in Example 1 was used in the liquid crystal layer 221.

The second linear dielectric projection 210 is located between the overcoat layer 218 and the common electrode 219 on the first substrate 214.

In the present example, silicon oxide was used as a material for the protective film 255 and silicon nitride as a material for the protective film 254. The refractive index of the protective film 254 is larger than that of the protective film 255 and the coating type insulating film 251, so that when the protective film 254 is present in the transmission portion, a reflection loss is caused, resulting in a decreased transmittance.

Therefore, the protective film 254 is omitted in the transmission portion in the present example.

In FIG. 4 and FIG. 5, a boundary in patterning of the protective film 254 is shown as a protective film 254 patterning position 259.

Liquid crystal molecules 220 are homogeneously oriented so that the direction of their orientation may be parallel to the direction of the long side of the pixel and substantially parallel to each of the first substrate 214 and the second substrate 215.

The pre-tilt angle, an angle between the substrate surface and a liquid crystal molecule in contact with the substrate is preferably as small as possible and is more preferably 0°.

Compounds represented by the formulas 16 to 19 were synthesized as typical examples of the compounds described in the first aspect of the invention, and added to a commercial fluorine-containing liquid crystal composition (Tni: 81.7° C., Δn: 0.083, Δε: 8.0, μ (20° C.): 31 cp) each in an amount of about 5% by weight, and the liquid crystal composition thus prepared (Tni: 74.4° C., Δn: 0.091, Δε: 8.1, μ (20° C.): 31 cp) was injected into the assembly obtained above, by vacuum enclosing. Also in the present example, the four typical compounds were added each in an amount of 5%. Such addition is for improving the low-temperature compatibility as in Example 1. Therefore, practically, it is also possible to add any amount of a compound having the structure specified in the present invention. This addition brings about effects expected in the present invention.

The liquid crystal display panel thus obtained was held between two polarizing plates. The polarizing plates were located so that the angle between the axis of transmission of polarized light of one of the polarizing plates and the above-mentioned direction of liquid crystal molecular orientation might be 45° and that the axis of transmission of polarized light of the other polarizing plate might be perpendicular to the above-mentioned direction of liquid crystal molecular orientation. Then, the assembly thus obtained was made into a module by connecting a driving circuit, a backlight and the like to the assembly, whereby an active-matrix type liquid crystal display device was obtained. In the present example, normally-open characteristics were attained which were such that a dark display was given at a low voltage and a light display at a high voltage.

The liquid crystal display device was operated at −20° C. and the moving picture quality was observed which was attained when an image was displayed as white stripes moving in the lateral direction on a black background. For comparison, the measurement of the surface temperature and the observation of the moving picture quality were similarly carried out also in the liquid crystal display device produced in Comparative Example 2.

As a result, although fuzz was observed at the boundary between the black background and the white stripes in both the liquid crystal display device of Example 3 and the liquid crystal display device of Comparative Example 2, it could be confirmed that the width of fuzz was reduced in the liquid crystal display device of Example 3 as compared with the liquid crystal display device of Comparative Example 2. Thus, the improvement of the moving picture quality could be confirmed which had been achieved by conducting the seventh to eleventh aspects of the invention.

Formula 16

Formula 17

Formula 18

Formula 19

COMPARATIVE EXAMPLE 2

In the same manner as in the case of the liquid crystal display device described in Example 3, an active-matrix sub- strate and an opposite substrate having a color filter formed thereon were produced and then assembled, after which a commercial fluorine-containing liquid crystal composition (Tni: 81.7° C., Δn: 0.083, Δε: 8.0, μ (20° C.): 31 cp) was injected into the assembly by vacuum enclosing. The liquid crystal display panel thus obtained was held between two polarizing plates. The polarizing plates were located so that the angle between the axis of transmission of polarized light of one of the polarizing plates and the above-mentioned direction of liquid crystal molecular orientation might be 45° and that the axis of transmission of polarized light of the other polarizing plate might be perpendicular to the above-mentioned direction of liquid crystal molecular orientation. Then, the assembly thus obtained was made into a module by connecting a driving circuit, a backlight and the like to the assembly, whereby an active-matrix type liquid crystal display device was obtained. As in Example 2, normally-open characteristics were attained which were such that a dark display was given at a low voltage and a light display at a high voltage.

EXAMPLE 4

In this example according to the twelfth aspect of the invention, an active-matrix substrate and an opposite substrate having a color filter formed thereon were produced and then assembled in the same manner as in the case of the liquid crystal display device described in Example 3. Then, compounds represented by the formulas 4 and 5 were added as examples of the compound specified in the twelfth aspect of the invention to the same liquid crystal composition as used in Example 3, each in an amount of 10% by weight, and the liquid crystal composition thus prepared was injected into the assembly obtained above, by vacuum enclosing. The liquid crystal display panel thus obtained was held between two polarizing plates 114. The polarizing plates 114 were located so that the axis of transmission of polarized light of one of the polarizing plates might be substantially parallel to the above-mentioned direction of liquid crystal molecular orientation and that the axis of transmission of polarized light of the other polarizing plate might be perpendicular to the above-mentioned direction of liquid crystal molecular orientation. Then, the assembly thus obtained was made into a module by connecting a driving circuit, a backlight and the like to the assembly, whereby an active-matrix type liquid crystal display device was obtained.

Formula 20

Formula 21

As a result, it could be confirmed by the result of visual evaluation that fuzz and color reproducibility during moving picture display had been further improved as compared with Example 3.

EXAMPLE 5

Figure 7:
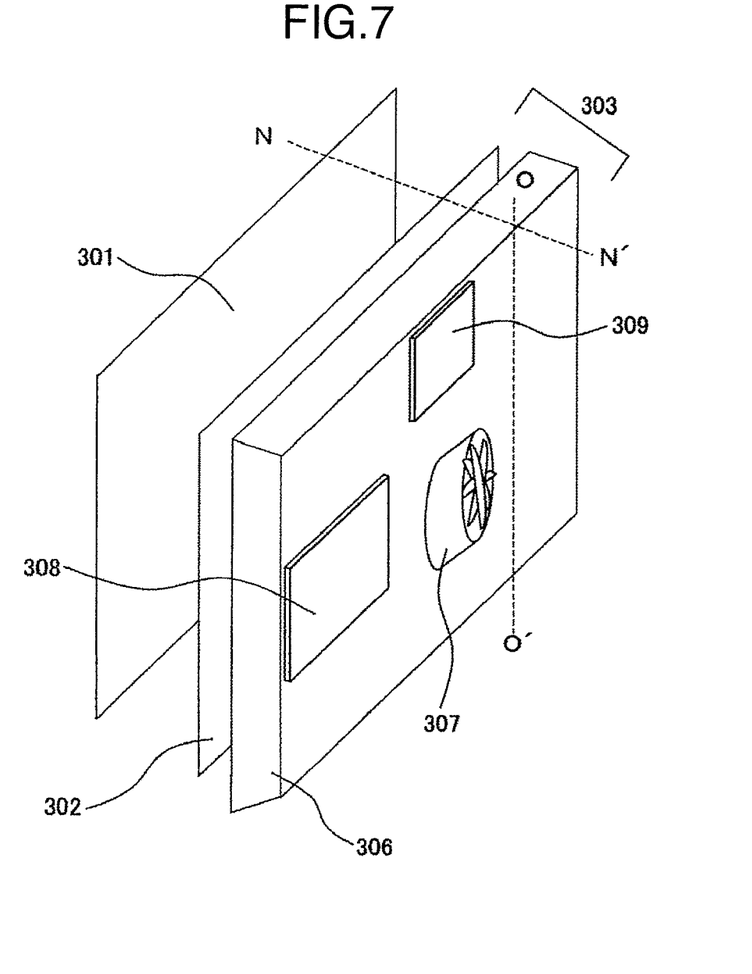
FIG. 7 is a diagram illustrating the backlight module of the liquid crystal display device of Example 5.
Figure 8:
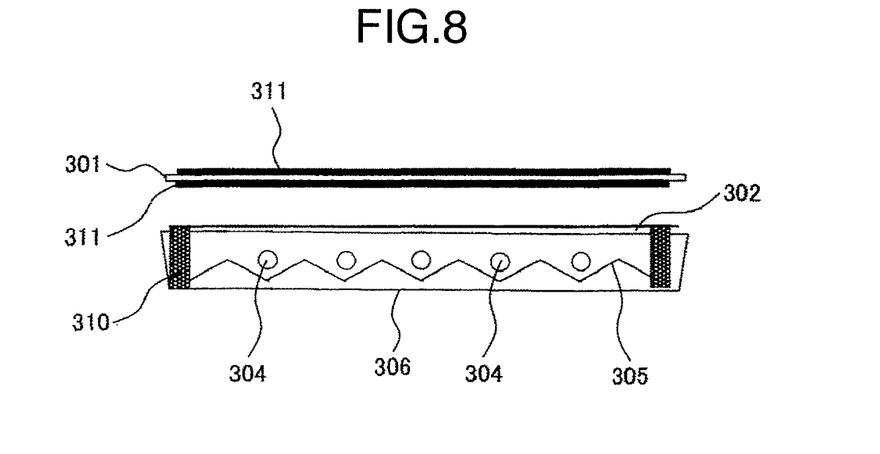
FIG. 8 is a cross-sectional view of the backlight module of the liquid crystal display device of Example 5.

The member for illumination of the liquid crystal display device according to the fifteenth to seventeenth aspects of the invention is explained below with reference to FIG. 7 and FIG. 8. FIG. 8 is a sectional view taken on a plane along the line N-N' and the line O-O'. A backlight module 303 is located on the reverse side of the same transmission type IPSLCD 301 as used in Example 1, through a diffusing plate 302. The backlight module 303 is composed of a cold-cathode tube 304, a mirror sheet 305, a box 306 and a forced-cooling apparatus. In the present example, an air-cooling method using a fan 307 is chosen. An inverter 308 for switching on the cold-cathode tube 304 and a controller 309 for driving IPSLCD 301 are located on the reverse side of the backlight module 303. A wiring for connecting the inverter 308, the cold-cathode tube 304, the controller 309 and IPSLCD to one another is omitted for simplification.

The mirror sheet 305 is fixed inside the box 306 in order to condense light from the cold-cathode tube 304 on IPSLCD 301. In addition, the diffusing plate 302 is held on a spacer 310 formed on the box 306, in order to homogenize light from the cold-cathode tube 304.

In order to accelerate heat release from the inside of the box 306, holes are preferably formed on the surface of the box on which the forced-cooling apparatus is located, to such an extent that the strength of the box is not deteriorated.

After the liquid crystal display device was operated for 2 hours at an external temperature of 25° C., the surface temperatures in the upper part and lower part of the display screen were measured. In addition, the moving picture quality was observed which was attained when an image was displayed as white stripes moving in the lateral direction on a black background. For comparison, the measurement of the surface temperatures and the observation of the moving picture quality were similarly carried out also in the liquid crystal display device produced in Comparative Example 3.

Table 3 shows the result of measuring the surface temperatures. It can be seen that according to the present invention, the difference in temperature between the upper part and lower part of the display screen is narrowed down. By the observation of the moving picture quality, it was confirmed that the liquid crystal display device of the present invention was good in moving picture quality in both the upper part and lower part of the display screen as compared with the liquid crystal display device of Comparative Example 1. Thus, according to the present invention, the moving picture quality is relatively uniform in the screen even when there is temperature nonuniformity in the screen even in the case of uniform lighting.

On the other hand, the following is conjectured: in the case of an illuminating member comprising a plurality of light sources the luminance values of which are independently controlled in regions, respectively, for example, the case where point light sources such as light-emitting diodes are located in array, the temperature in the screen is more liable to become nonuniform as compared with the present example. It can be speculated that also in this case, the temperature uniformity can be improved by a combination of the liquid crystal material and the illuminating member which are specified in the present invention.

TABLE 3

|  | Present invention | Comparative Example 1 |
| --- | --- | --- |
| Temperature of upper portion of display screen | 43° C. | 44° C. |
| Temperature of lower portion of display screen | 36° C. | 36° C. |

COMPARATIVE EXAMPLE 3

A liquid crystal display device was produced in the same manner as in the case of the liquid crystal display device of Example 5 except for using the same IPSLCD as used in Comparative Example 1, in place of the IPSLCD used in Example 5.

The present invention is an important invention that improves the moving picture quality of liquid crystal display devices used in liquid crystal televisions, mobile phones, PDA, etc.

The invention claimed is:

1. A liquid crystal display device comprising
a pair of substrates,
a liquid crystal layer located between the pair of the substrates,
a group of electrodes located on at least one of the pair of the substrates and capable of applying an electric field to the liquid crystal layer,
a color filter located on one of the substrates, and
a polarizing plate located on at least one of the substrates,
wherein the liquid crystal layer has two or more regions different in thickness in the direction substantially perpendicular to the substrates,
wherein a liquid crystal composition constituting the liquid crystal layer contains one or more compounds represented by the formula 1 wherein each of $X_1$ and $X_2$ is an alkyl group, an alkenyl group, an alkoxy group, an alkenyloxy group, a substituent formed by fluorination of any of these groups, a halogen atom, a cyano group, a nitro group or an isothiocyano group; Ps are independently a fluorine atom, a hydrogen atom or an alkyl group; A and B are independently $-CF_2O-$, $-CH_2CH_2-$, $-CH_2O-$ or $-CF_2-CH_2-$ which have a structure comprising single bonds; each of $Z_1$, $Z_2$ and $Z_3$ is a molecular group comprising a 6-membered ring and selected from a benzene ring, a cyclohexane ring, a fluorinated benzene ring and a fluorinated cyclohexane ring; and each of m and o is 0 or 1; and n is 1 or 2:

Formula 1 wherein said color filter comprises red, green and blue color filters, and two or more regions different in the thickness of said liquid crystal layer are formed because the red, green or blue color filter has a non-uniform thickness in the direction perpendicular to said substrates.

2. A liquid crystal display device according to claim 1, wherein each of said red, green and blue color filters is formed in thickness independent of the thickness of the other color filters.

3. A liquid crystal display device according to claim 1, wherein the thickness values d1 and d2 of the regions different in thickness of said liquid crystal layer and the optical response time τ between black level and white level of said liquid crystal composition in the region of d1 in thickness satisfy the relationship represented by the following expression:

$$d1/d2 \geq \sqrt{(0.34/\tau+1)}.$$

4. A liquid crystal display device according to claim 1, wherein a compound contained as a second component in said liquid crystal composition satisfies the inequality $|\Delta\epsilon| \leq 2$ and has a molecular weight of 250 or less.

5. A liquid crystal display device according to claim 1, wherein the compound of the above formula 1 has a chemical structure represented by the formula 2 wherein each of $X_1$ and $X_2$ is an alkyl group, an alkenyl group, an alkoxy group, an alkenyloxy group, a substituent formed by fluorination of any of these groups, a halogen atom, a cyano group, a nitro group or an isothiocyano group, and Ps are independently a fluorine atom, a hydrogen atom or an alkyl group:

Formula 2

6. A liquid crystal display device according to claim 1, wherein a reflector plate is located on one of the pair of the substrates and a reflection region and a transmission region are formed in each pixel.

7. A liquid crystal display device according to claim 6, wherein said reflector plate functions as an electrode.

8. A liquid crystal display device according to claim 6, wherein said liquid crystal layer is formed so that its thickness in the direction perpendicular to said substrates may be smaller in said reflection region than in said transmission region.

9. A liquid crystal display device according to claim 6, wherein in said reflection region, an insulating film is located on one of the pair of the substrates so as to face the substrate surface, and owing to the thickness of the thus located insulating film, a region is formed in which the thickness of said liquid crystal layer in said transmission region and that in said reflection region are different.

10. A liquid crystal display device according to claim 1, wherein the liquid crystal composition constituting the liquid crystal layer further contains a compound of the formula 3;

$$X_2\text{-}Z_2\text{-}Z_1\text{-}X_1 \qquad \text{Formula 3,}$$

wherein in the formula 3, each of $X_1$ and $X_2$ is an alkyl group, an alkenyl group, an alkoxy group, an alkenyloxy group, a substituent formed by fluorination of any of these groups, a halogen atom, a cyano group, a nitro group or an isothiocyano group; each of $Z_1$ and $Z_2$ is a molecular group comprising a 6-membered ring and selected from a benzene ring, a cyclohexane ring, a fluorinated benzene ring and a fluorinated cyclohexane ring; and each of m and o is 0 or 1; and n is 1 or 2.

* * * * *